(12) United States Patent
Natsume et al.

(10) Patent No.: US 7,228,895 B2
(45) Date of Patent: Jun. 12, 2007

(54) AIR DIRECTION CHANGING SYSTEM FOR VEHICULAR AIR DUCTS

(75) Inventors: Takuya Natsume, Kariya (JP); Takahiro Tokunaga, Kosai (JP)

(73) Assignee: DENSO Corporation, Kariya (JP)

( * ) Notice: Subject to any disclaimer, the term of this patent is extended or adjusted under 35 U.S.C. 154(b) by 38 days.

(21) Appl. No.: 10/663,142

(22) Filed: Sep. 16, 2003

(65) Prior Publication Data

US 2004/0069483 A1  Apr. 15, 2004

(30) Foreign Application Priority Data

Sep. 17, 2002 (JP) ............................. 2002-270095

(51) Int. Cl.
*B60H 1/00* (2006.01)
(52) U.S. Cl. ........................ 165/204; 165/42; 454/160; 454/161
(58) Field of Classification Search ................ 165/202, 165/203, 204, 42, 43; 454/160, 161, 121, 454/156

See application file for complete search history.

(56) References Cited

U.S. PATENT DOCUMENTS

| | | | |
|---|---|---|---|
| 5,476,418 A | | 12/1995 | Loup |
| 5,676,595 A | * | 10/1997 | Sumiya et al. ............... 454/121 |
| 6,092,592 A | * | 7/2000 | Toyoshima et al. .......... 165/204 |
| 6,231,437 B1 | | 5/2001 | Loup et al. |
| 6,247,530 B1 | | 6/2001 | Mochizuki et al. .......... 165/204 |
| 6,622,787 B1 | * | 9/2003 | Toyoshima et al. .......... 165/203 |
| 2002/0108385 A1 | | 8/2002 | Rivalta et al. |

FOREIGN PATENT DOCUMENTS

| | | |
|---|---|---|
| FR | 2 771 966 | 6/1999 |
| FR | 2 798 322 | 3/2001 |
| JP | 11-129730 | 5/1999 |

* cited by examiner

*Primary Examiner*—Ljiljana Ciric
(74) *Attorney, Agent, or Firm*—Harness, Dickey & Pierce, PLC

(57) ABSTRACT

A vehicle air conditioning system secures an appropriate temperature difference in the air blown through vertically arranged air ducts when the system is in a bi-level mode. A hot air inlet is disposed above a cool air inlet. A face opening is disposed at an upper location while foot openings are disposed at a lower location. A blow mode-changing door for opening and closing both the openings is a butterfly type door. The blow mode-changing door is pivotally disposed in a door housing. In the bi-level mode in which the blow mode-changing door opens both the foot openings and the face opening, a bi-level mode bypass passageway for introducing cool air from the cool air inlet into the face opening is defined between an extremity of the blow mode-changing door and the inner wall surface of the door-housing portion.

11 Claims, 6 Drawing Sheets

FACE MODE

FOOT MODE

B/L MODE

FULLY CLOSED MODE

B/L MODE

AIR DIRECTION CHANGING SYSTEM FOR VEHICULAR AIR DUCTS

CROSS REFERENCE TO RELATED APPLICATION

This application is based upon, claims the benefit of priority of, and incorporates by reference, the contents of Japanese Patent Application No. 2002-270095 filed Sep. 17, 2002.

BACKGROUND OF THE INVENTION

1. Field of the Invention

The present invention relates to an air direction-changing portion of an air blower in a vehicle air conditioning system.

2. Description of the Related Art

In a conventional vehicle air conditioning system, a front seat air conditioning unit integrated with a rear seat air temperature adjustment portion and a rear seat air direction changing portion are known. The air conditioning unit is generally located behind an instrument panel at a forward area of the passenger compartment.

Since such an air conditioning unit shares one heater core in adjustment of the temperature of the air blown toward the front and rear seats, a rear seat cool air bypass passageway is disposed below the heater core. As a result, as shown in FIG. 6, a rear seat hot air inlet 34, into which hot air is introduced after having passed through the heater core, is disposed at an upper position, whereas a rear seat cool air inlet 33, into which cool air from a rear seat cool air bypass passageway 30 is introduced, is disposed at a lower position, the positions being relative to each other.

The air conditioning unit is also designed to allow a rear seat air mix door 31 to adjust the airflow ratio between the hot air from the rear seat hot air inlet 34 and the cool air from the rear seat cool air inlet 33, thereby adjusting the air temperature blown toward the rear seats.

On the other hand, in a rear seat blow mode-changing portion 35, a rear seat face opening 37 is disposed at an upper location, whereas rear seat foot openings 38 are disposed at a lower location, relative to each other. This is because a rear seat face duct (not shown) connected to the rear seat face opening 37 is disposed at an upper location, whereas rear seat foot ducts (not shown) connected to the rear seat foot openings 38 are disposed at a lower location.

FIG. 6 illustrates a bi-level mode selected as a rear seat blow mode, where a rear seat blow mode changing door 39 comprising a butterfly door formed in the shape of the Japanese character "ヘ(he)" is operatively rotated to a position at which both, the rear seat face opening 37 and the rear seat foot opening 38, are simultaneously opened.

In the aforementioned arrangement, however, the hot air from the rear seat hot air inlet 34 and the cool air from the rear seat cool air inlet 33 are separated into an upper and a lower portion by means of the plate surfaces of the rear seat air mix door 31 and the rear seat blow mode changing door 39. This causes most of the hot air from the hot air inlet 34 located at the upper location to flow through a passageway above the plate surfaces of both the doors 31, 39 into the rear seat face opening 37 located at its upper location. On the other hand, this also causes most of the cool air from the cool air inlet 33 located at the lower location to flow through a passageway below the plate surfaces of both the doors 31, 39 into the rear seat foot openings 38 located at the lower location.

For this reason, in the rear seat bi-level mode, the temperature of the air blown toward an occupant's face becomes higher than the air temperature blown toward an occupant's feet, thereby providing a blown air temperature distribution that is opposite to a head-cooling foot-heating blown air temperature distribution. Accordingly, this temperature distribution causes rear seat passengers to feel cold at their lower bodies and hot at their upper bodies.

The aforementioned problem could be overcome by locating the rear seat face opening 37 at a lower location and the rear seat foot openings 38 at an upper location. However, this may in turn require the rear seat face duct to be bent upwardly from the installed location of the rear seat face opening 37 (from the lower location) as well as the rear seat foot ducts to be bent downwardly from the installed location of the rear seat foot openings 38 (from the upper location).

Consequently, this may lead to an increase in pressure loss (pressure loss caused by bending) of the rear seat face duct and the rear seat foot ducts, thereby raising another problem of reducing the airflow amount directed toward the rear seat. This may also make it impossible to provide bends in both the aforementioned ducts due to the restriction of vehicular installation mounting space. Accordingly, the aforementioned measures of disposing the rear seat face opening 37 at a lower location and the rear seat foot openings 38 at an upper location are impractical.

SUMMARY OF THE INVENTION

The present invention has been devised in view of the aforementioned problems. It is therefore an object of the present invention to ensure an appropriate vertical blow temperature difference in the bi-level mode in a vehicle air conditioning system in which the hot air inlet is disposed at an upper location and the cool air inlet is disposed at a lower location with the face opening being disposed at an upper location and the foot openings being disposed at a lower location.

To achieve the aforementioned object, according to a first aspect of the invention, a vehicle air conditioning system has: a cool air inlet (33); a hot air inlet (34) disposed above the cool air inlet (33); a foot opening (38) disposed at a lower location downstream of the cool air inlet (33) and the hot air inlet (34); a face opening (37) disposed at an upper location downstream of the cool air inlet (33) and the hot air inlet (34); a blow mode-changing door (39), of a butterfly style, for opening or closing the foot opening (38) and the face opening (37); and a door-housing portion (36) for pivotally housing the blow mode changing door (39). The vehicle air conditioning system is characterized in that in a bi-level mode in which the blow mode changing door (39) opens both the foot opening (38) and the face opening (37), a bi-level mode bypass passageway (45) for introducing cool air from the cool air inlet (33) into the face opening (37) is defined between an extremity of the blow mode changing door (39) and an inner wall surface of the door-housing portion (36).

In the bi-level mode, this allows the cool air from the cool air inlet (33) located at the lower location to be positively introduced through the bi-level mode bypass passageway (45) into the face opening (37) located at the upper location.

Correspondingly, the pressure at the foot opening (38) is reduced to be less than at the face opening (37), thereby allowing the hot air from the hot air inlet (34) to be introduced more likely into the foot opening (38). That is, even with the hot air inlet (34) being located at an upper location and the foot opening (38) being located at a lower location, the hot air from the hot air inlet (34) can be introduced into the foot opening (38).

As described above, even in a vehicle air conditioning system that has the hot air inlet (34) disposed at an upper location, the cool air inlet (33) disposed at a lower location, the face opening (37) disposed at an upper location, and the foot opening (38) disposed at a lower location, it is possible to ensure an appropriate vertical blown air temperature difference of the head-cooling foot-heating type in the bi-level mode, thereby providing an improved air conditioned feeling.

According to a second aspect of the present invention, in the vehicle air conditioning system of the first aspect, a sealing rib (43a to 43c) is provided on the inner wall surface of the door-housing portion (36), and the blow mode changing door (39) sealingly abuts against the sealing rib (43a to 43c), thereby simultaneously blocking both the foot opening (38) and the face opening (37). This makes it possible to provide a fully closed mode in which both the openings (37, 38) are blocked at the same time.

According to a third aspect of the present invention, in the vehicle air conditioning system of the first or second aspect, the door-housing portion is formed of a cylindrical portion (36) parallel to an axial direction of the blow mode-changing door (39). Furthermore, an expanded portion (44) expanded radially outward is formed on part of a circumferential surface of the cylindrical portion (36), and the bi-level mode bypass passageway (45) is formed inside the expanded portion (44).

Forming the expanded portion (44) expanded radially outward on part of the circumferential surface of the cylindrical portion (36) in this manner makes it possible to easily define the bi-level mode bypass passageway (45).

According to a fourth aspect of the present invention, in the vehicle air conditioning system of the third aspect, the cylindrical portion (36) is disposed so as to extend in the transverse, that is, the transverse direction of the vehicle, with the expanded portion (44) and the face opening (37) being disposed at a central portion of the cylindrical portion (36) in the transverse direction of the vehicle. The foot opening (38) is disposed at either end of the cylindrical portion (36) in the transverse direction of the vehicle (100).

According to this configuration of the aspect, since the expanded portion (44) is formed at the central portion of the cylindrical portion (36) in the transverse direction of the vehicle, the bi-level mode bypass passageway (45) is also formed at the central portion. This allows the cool air from the bi-level mode bypass passageway (45) at the central portion to be effectively introduced toward the face opening (37) located at the central portion.

To the contrary, the foot openings (38) are located at both the side portions of the cylindrical portion (36) in the transverse direction of the vehicle and thus apart from the mainstream of the cool airflow (the flow at the central portion in the transverse direction), thereby more likely allowing the hot air from the hot air inlet (34) to be introduced into the foot openings (38).

In combination of the aforementioned actions, it is possible to provide a further increased vertical blow temperature difference of the head-cooling foot-heating type in the bi-level mode.

According to a fifth aspect of the present invention, in the vehicle air conditioning system of the first or second aspect, the door-housing portion (36) is disposed so as to extend in the transverse direction of the vehicle; the foot opening (38) is disposed at either side of the cylindrical portion (36) in the transverse direction of the vehicle; a width of the cool air inlet (33) in the transverse direction of the vehicle is less than a width of the hot air inlet (34) in the transverse direction of the vehicle; and the bi-level mode bypass passageway (45) is located at a position corresponding to the cool air inlet (33) in the door-housing portion (36) in the transverse direction of the vehicle.

According to this arrangement, the width of the cool air inlet (33) in the transverse direction of the vehicle is less than the width of the hot air inlet (34) in the transverse direction of the vehicle, and the bi-level mode bypass passageway (45) is located at the position corresponding to the cool air inlet (33) in the door-housing portion (36) in the transverse direction of the vehicle. This makes it possible to effectively introduce the cool air from the cool air inlet (33) through the bi-level mode bypass passageway (45) toward the face opening (37).

Furthermore, the foot openings (38) are disposed at both side portions of the cylindrical portion (36) in the transverse direction of the vehicle, and the width of the hot air inlet (34) in the transverse direction of the vehicle is greater than the width of the cool air inlet (33) in the transverse direction of the vehicle. This causes the hot air from the hot air inlet (34) to be introduced more likely into the foot openings (38).

In combination of the aforementioned actions, it is possible to provide a further increased vertical blow temperature difference of the head-cooling foot-heating type in the bi-level mode.

According to a sixth aspect of the present invention, the vehicle air conditioning system of any one of the first to fifth aspects is provided with an air conditioning case (11) through which air to be blown toward front seats in a passenger compartment flows; a heating heat exchanger (13), disposed within the air conditioning case (11), for heating air; and a rear seat cool air bypass passageway (30) disposed below the heating heat exchanger (13) within the air conditioning case (11). In this configuration, the cool air inlet (33) is a rear seat cool air inlet into which cool air is introduced from the rear seat cool air bypass passageway (30); the hot air inlet (34) is a rear seat hot air inlet into which hot air having passed through the heating heat exchanger (13) is introduced; the foot opening (38) is a rear seat foot opening for blowing air toward the feet of a rear seat passenger; and the face opening (37) is a rear seat face opening for blowing air toward the upper body of a rear seat passenger. The air that is blown through the air conditioning case (11) blows toward the front seats (101, 102) in the passenger compartment (105). The passenger compartment (105) also contains rear seats (103, 104).

In an arrangement in which a rear seat blow mode-changing portion is integrated into an air conditioning unit for conditioning front seats in a passenger compartment, this makes it possible to provide a vehicle air conditioning system that makes use of the actions and effects according to the first to fifth aspects.

Incidentally, the parenthesized numerals accompanying the foregoing description correspond with those of the embodiments to be described later. Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

First Embodiment

Figure 1:
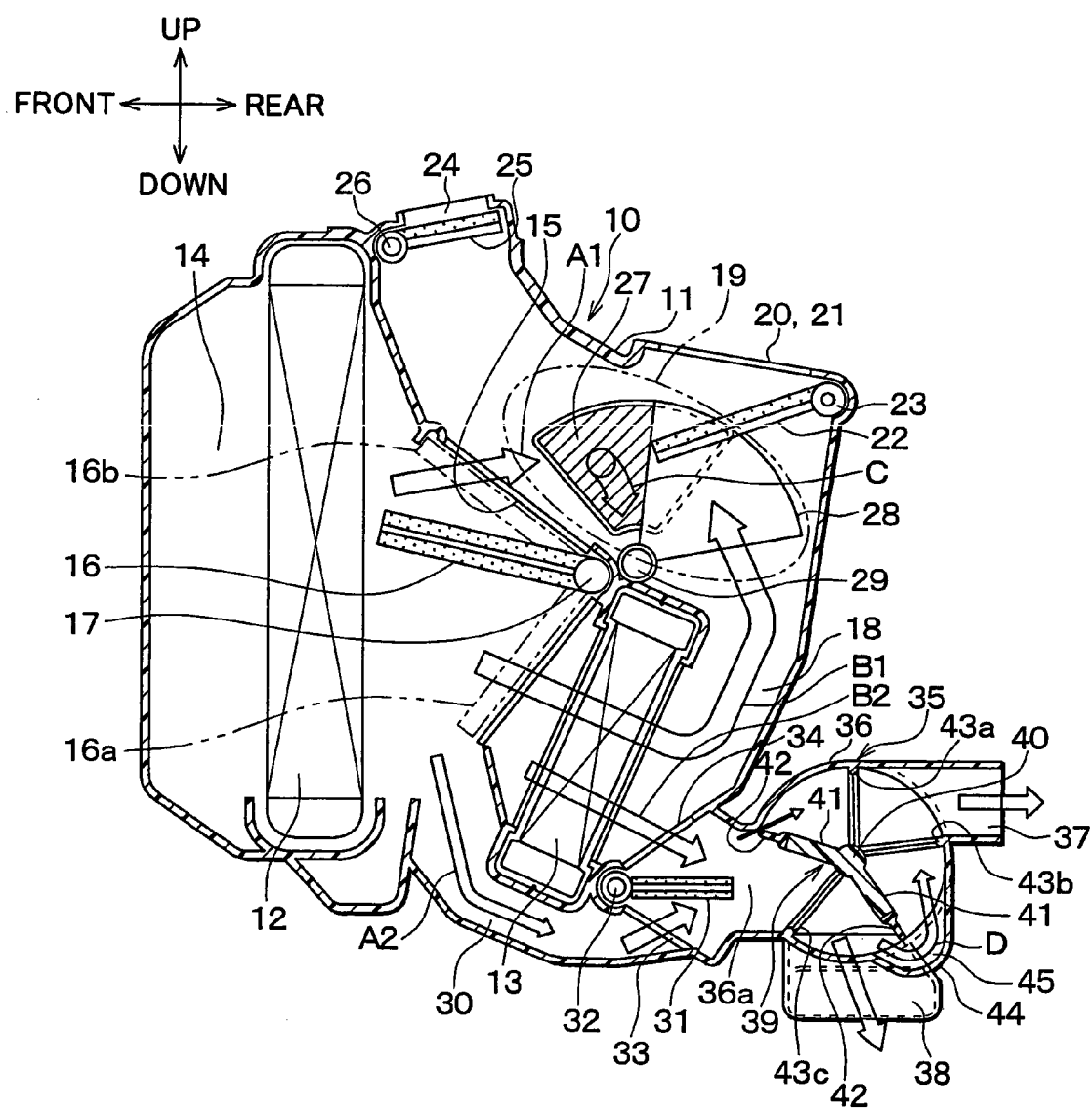
FIG. 1 is a longitudinal cross-sectional view showing a portion of an air conditioning unit according to a first embodiment of the present invention.
Figure 2:
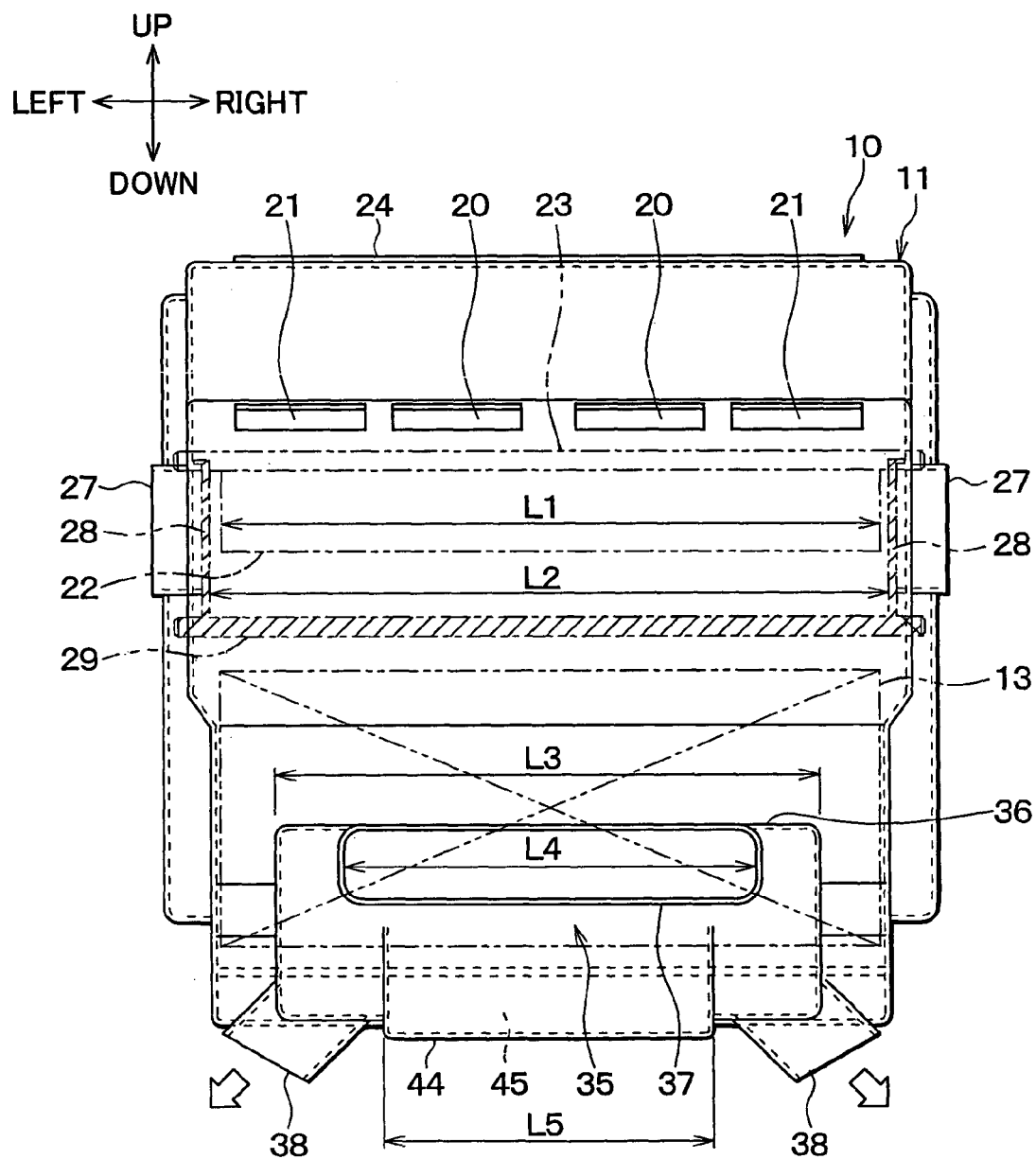
FIG. 2 is a front view showing the air conditioning unit portion of FIG. 1 when viewed from the rear of the vehicle.
Figure 7:
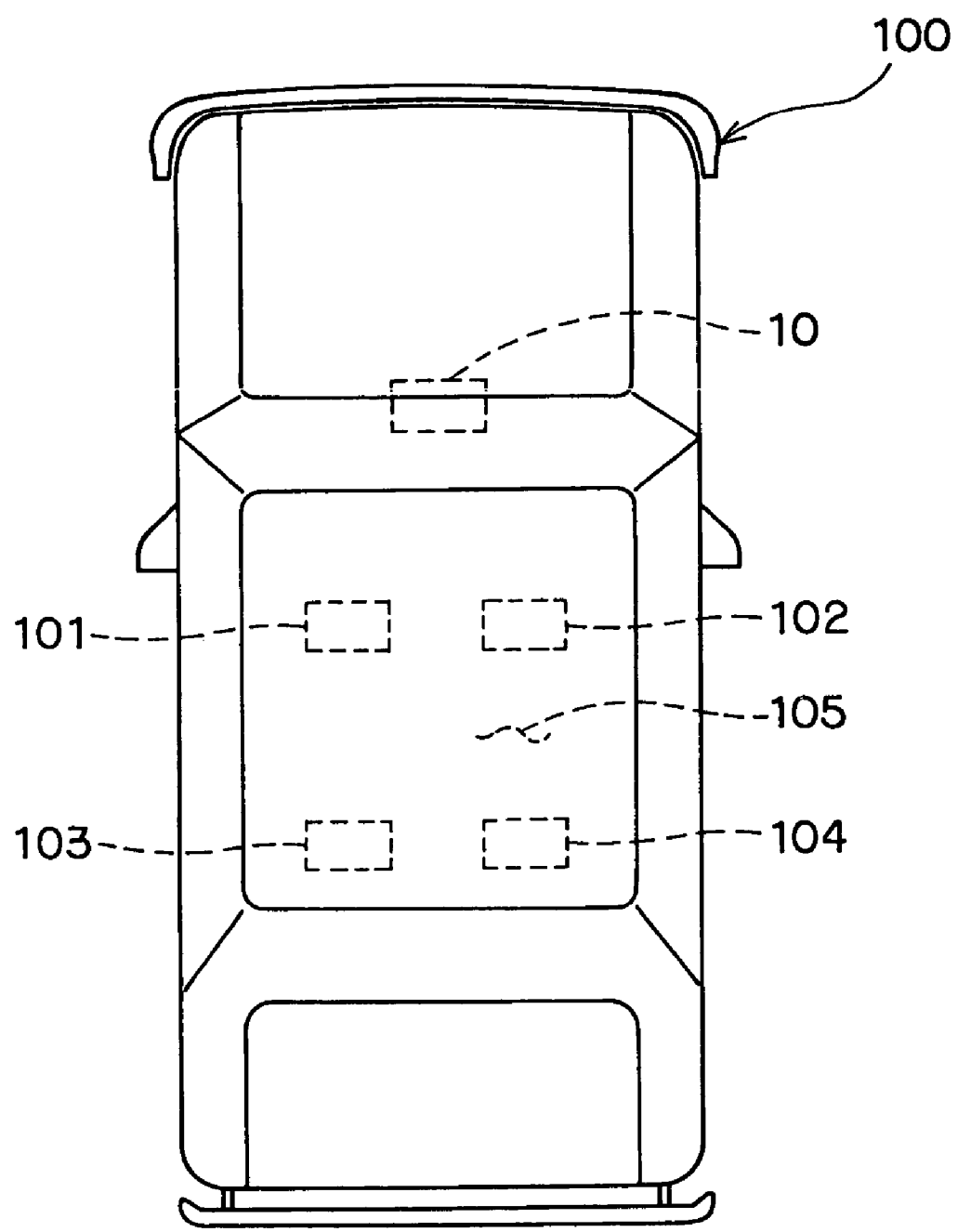
FIG. 7 is a top view of an automobile in which the air conditioning unit is located.

An interior unit portion of a vehicle air conditioning system according to the first embodiment is largely divided into two portions. The first portion is an air conditioning unit 10 as shown in FIGS. 1 and 2, and the second is a blower unit (not shown) for introducing air into the air conditioning unit 10. FIG. 1 is a cross-sectional view taken in the front-to-rear, that is, longitudinal direction of a vehicle 100 (FIG. 7), and FIG. 2 is a front view illustrating the air conditioning unit 10 when viewed from the rear of the vehicle 100.

Behind an instrument panel (not shown) at the front portion of the passenger compartment, the air conditioning unit 10 is disposed generally at the central portion in the transverse, hereafter transverse, direction of the vehicle. At the central portion behind the instrument panel in the passenger compartment, the air conditioning unit portion 10 is generally disposed in the mounting orientations indicated by the arrows in FIGS. 1 and 2 with respect to each of the front/rear, the up/down, and the left/right directions.

In contrast to this, behind the instrument panel at the front portion of the passenger compartment, the blower unit (not shown) is disposed from the central portion toward the front passenger seat. As is well known, the blower unit has an inside and outside air switching box for switchably introducing outside air (air outside of the passenger compartment) and inside air (air inside the passenger compartment), and a centrifugal type air blower for drawing and expelling air through the inside and outside air switching box.

The air conditioning unit 10 has an air conditioning case 11 made of resin. Inside the air conditioning case 11, there is provided an air passageway through which air flows toward the passenger compartment from the front of the vehicle to the rear of the vehicle. More specifically, the air conditioning case 11 is constructed such that a left split case and a right split case, which are divided into the left and right along a split face at the central portion in the transverse direction of the vehicle, are integrally joined together.

The air conditioning case 11 is integrated with both an evaporator 12 serving as a heat exchanger for cooling operations and a heater core 13 serving as a heat exchanger for heating operations. An air inlet space 14 is defined at the front-most portion in the vehicle inside the air conditioning case 11. Air is introduced into the air inlet space 14 from the scroll-casing outlet of the centrifugal type air blower of the aforementioned blower unit.

The evaporator 12 is disposed in the up/down direction (generally vertical) at a position immediately after the air inlet space 14 in the air conditioning case 11. As is well known, in a refrigeration cycle, the evaporator 12 absorbs latent heat of a refrigerant from conditioned air to thereby cool the conditioned air. The heater core 13 is disposed downstream in the airflow from the evaporator 12, or at the rear of the vehicle, and spaced therefrom a predetermined distance. Accordingly, the air introduced into the air inlet space 14 in the air conditioning case 11 passes through the evaporator 12 and the heater core 13, in that order, to flow from the front of the vehicle toward the rear thereof.

The heater core 13 is disposed generally in a vertical direction in the air conditioning case 11. However, in this embodiment, the heater core 13 is installed at a small angle relative to and thus generally in the vertical direction with its upper end portion being located closer to the rear of the vehicle than its lower end portion.

The heater core 13 is designed to reheat the cool air having passed through the evaporator 12 and allows high-temperature hot water (an engine coolant) from the vehicle engine (not shown) to flow therethrough to use the hot water as a heat source for heating air.

There is formed a front seat cool air bypass passageway 15 at a portion above the heater core 13. The cool air bypass passageway 15 defines a passageway for the cool air having passed through the evaporator 12 to bypass around the heater core 13. Additionally, at a portion below the front seat cool air bypass passageway 15 between the evaporator 12 and the heater core 13, a front seat air mix door 16 is pivotally disposed about a pivot 17.

Here, the front seat air mix door 16 has a flat plate door integrated with the pivot 17. The front seat air mix door 16 serves as a front seat temperature adjustment means which adjusts the airflow ratio between cool air A1 flowing through the front seat cool air bypass passageway 15 and bypassing around the heater core 13 and hot air B1 heated in the heater core 13, thereby adjusting the temperature of the air blown to the front seats in the passenger compartment.

The pivot 17 is disposed so as to extend near the upper end portion of the heater core 13 in the transverse direction (in the vertical direction from or into the page of FIG. 1) of the vehicle. Additionally, the pivot 17 is rotatably supported at bearing holes (not shown) on the sidewall surfaces at both the right and left sides of the air conditioning case 11. One end portion of the pivot 17 protrudes out of the air conditioning case 11 and is coupled via a link mechanism (not shown) to a front seat temperature adjustment actuator mechanism equipped with a servo motor or the like. This actuator mechanism is adapted to adjust the rotational position of the air mix door 16.

Additionally, downstream of the heater core 13 along the airflow in the air conditioning case 11 (at a rearward portion in the vehicle), there is formed a front seat hot air passageway 18 that is directed upwardly immediately after the heater core 13. The space located downstream (at an upper portion) of the front seat hot air passageway 18 merges above the heater core 13 with a downstream portion of the front seat cool air bypass passageway 15, thereby defining a front seat air mix zone 19 for mixing cool air and hot air.

On the other hand, there are provided front seat face openings 20, 21 at a portion immediately above the front seat air mix zone 19 on an upper surface portion of the air conditioning case 11, i.e., on an upper surface portion at a rearward position of the vehicle in the air conditioning case 11. As shown in FIG. 2, the front seat face openings 20, 21 are divided into four in the transverse direction of the vehicle.

The two front seat face openings 20 located at the central portion in the transverse direction of the vehicle are center face openings, and the side face openings 21 are located at both the right and left side portions of the center face openings 20. The center face openings 20 are connected via center face ducts (not shown) to center face outlets located at an upper location of the central portion of the instrument panel in the transverse direction, blowing conditioned air, at the central portion of the passenger compartment in the transverse direction, from the center face outlets toward the upper body of front seat passengers.

On the other hand, the side face openings 21 are connected via side face ducts (not shown) to side face outlets located near both end portions of the instrument panel in the transverse direction and blow conditioned air near both the right and left end portions of the passenger compartment from the side face outlets toward the upper body of front seat passengers.

In the air conditioning case 11, there is disposed a front seat face door 22 below the front seat face openings 20, 21 to open or close the front seat face openings 20, 21. As shown in FIG. 2, the front seat face door 22 is an elongated rectangular plate-shaped door that extends in the transverse direction of the vehicle and is connected to a pivot 23 located on an upper surface portion at a rearward end portion of the vehicle in the air conditioning case 11 so as to be pivotable about the pivot 23.

There is also provided a defroster opening 24 on an upper surface portion of the air conditioning case 11, the portion being located more frontward in the vehicle than the front seat face openings 20, 21. The defroster opening 24, into which temperature-controlled conditioned air is introduced from the front seat air mix zone 19, is connected via a defroster duct (not shown) to a defroster outlet to blow the conditioned air from the defroster outlet toward the inner surface of the front window glass of the vehicle.

A defroster door 25 is disposed below the defroster opening 24 in the air conditioning case 11 to open and close the defroster opening 24. Like the front seat face door 22, the defroster door 25 is an elongated rectangular plate-shaped door that extends in the transverse direction of the vehicle, and is coupled to a pivot 26 located inside the air conditioning case 11 at a frontward location of the defroster opening 24 in the vehicle so as to pivot about the pivot 26.

There are also provided front seat foot openings 27 at both right and left sides of the air conditioning case 11 (see FIG. 2). As shown in FIG. 1, the front seat foot openings 27 are disposed at a location where they overlap a region of the front seat air mix zone 19 located above the heater core 13. The front seat foot openings 27 are formed in the shape of a sector that has an enlarged area at its upper portion relative to its lower portion.

There are provided sector-shaped foot doors 28, which are pivotable about a pivot 29, in order to open or close the sector-shaped front seat foot openings 27. The pivot 29 is disposed between the lower end portion of the sector-shaped front seat foot openings 27 and the upper end portion of the heater core 13, and extends in the transverse direction of the vehicle such that both ends of the pivot 29 are pivotably supported at both right and left sides of the air conditioning case 11, as shown in FIG. 2.

In this arrangement, the sector-shaped front seat foot doors 28 are disposed to oppose both the right and left side inner walls of the air conditioning case 11 near both the ends of the pivot 29, and slide along the side inner walls of the air conditioning case 11 to thereby be able to provide side sealing to open or close the front seat foot openings 27. The sector-shaped front seat foot doors 28 and the pivot 29 can be integrally formed of resin. The front seat foot openings 27 are oriented toward the passenger compartment from both the right and left sides of the air conditioning case 11 to blow conditioned air to the feet of the front seat passengers.

Illustrated in FIG. 1 is a bi-level mode in which the front seat face door 22 causes the front seat face openings 20, 21 generally to be in a half open position, while the front seat foot doors 28 simultaneously cause the front seat foot openings 27 to generally be in a half open position. In the figure, the shaded portion of the front seat foot openings 27 indicate the range of opening of the front seat foot doors 28, and front seat foot blown air is introduced downwardly from the range of opening indicated by the shaded portion as shown by arrow C. The portion indicated by dashed lines of the front seat foot openings 27 shows the range to be blocked by the front seat foot doors 28.

As can be seen from FIG. 1, the rotational path ranges of the front seat face door 22 and the front seat foot doors 28 partially overlap each other when viewed in the transverse direction of the vehicle. In this context, as shown in FIG. 2, the distance L2 between the two front seat foot doors 28, located at both the right and left sides, is made larger by a predetermined amount than the length L of the front seat face door 22 in the transverse direction of the vehicle. This allows the front seat foot doors 28 to pivot along the side inner walls of the case 11 outside the right and left sides of the front seat face door 22 in the transverse direction of the vehicle, thereby preventing interference between both doors 22, 28.

The front seat face door 22, the defroster door 25, and the front seat foot doors 28 are door means for switching the front seat blow modes, in which the pivots 23, 26, and 29 of their respective doors 22, 25, and 28 are coupled via a link mechanism (not shown) on an exterior surface of the air conditioning case 11 to an actuator mechanism. The actuator mechanism comprises a servomotor or the like for switching the front seat blow modes, and is operatively actuated by the actuator mechanism.

Now, the rear seat temperature adjustment portion and blow mode changing portion will be described below which are integrated with the air conditioning unit 10 according to this embodiment.

The rear seat cool air bypass passageway 30 through which rear seat cool air A2 flows is defined below the heater core 13 inside the air conditioning case 11. Furthermore, the rear seat air mix door 31 is disposed at a rear lower side of the heater core 13 inside the air conditioning case 11 so as to be pivotable about a pivot 32 in the up/down direction of the vehicle. The rear seat air mix door 31 is also made up of a flat plate door integrated with the pivot 32.

In this arrangement, the rear seat cool air bypass passageway 30 is in communication through the rear seat cool air inlet 33 with a space below the rear seat air mix door 31. On the other hand, the lower portion of the heat exchanger of the heater core 13 is in communication through the lower end portion of the front seat hot air passageway 18 and the rear seat hot air inlet 34 with a space above the rear seat air mix door 31.

Accordingly, the rear seat cool air A2 is introduced into the space below the rear seat air mix door 31, whereas the rear seat hot air B2 heated at the lower portion of the heat exchanger portion of the heater core 13 is introduced into the space above the rear seat air mix door 31. In this embodiment, both the rear seat cool air inlet 33 and the rear seat hot air inlet 34 are formed in the shape of a rectangle having a longer side in the transverse direction of the vehicle (in the direction perpendicular to the page of FIG. 1).

Selecting the rotational position of the rear seat air mix door 31 allows the degree of opening of the rear seat cool air inlet 33 and the rear seat hot air inlet 34 to be adjusted, thereby controlling the airflow ratio between the rear seat cool air A2 and rear seat hot air B2. This makes it possible to independently adjust the temperature of air blown toward the rear seats and the front seats in the passenger compartment. Accordingly, the rear seat air mix door 31 serves as a rear seat temperature adjustment means.

The pivot 32 is disposed to extend in the transverse direction of the vehicle (in the direction perpendicular to the page of FIG. 1). The pivot 32 is also pivotably supported at bearing holes (not shown) on both right and left sidewalls of the air conditioning case 11. One end portion of the pivot 32 protrudes out of the air conditioning case 11 and is coupled via a link mechanism (not shown) to a rear seat temperature adjustment actuator mechanism equipped with a servo motor or the like. The actuator mechanism is adapted to adjust the rotational position of the front seat air mix door 16.

The rear seat blow mode changing portion 35 is disposed downstream of the rotational working space of the rear seat air mix door 31, i.e., at a rearward portion of the vehicle. The rear seat blow mode-changing portion 35 is provided with a cylindrical portion 36 serving as a door-housing portion. As shown in FIG. 2, the cylindrical portion 36 is integrated with the air conditioning case 11 so as to extend in the transverse direction of the vehicle in the range of a width of L3 (in a direction perpendicular to the page of FIG. 1). Both side portions of the cylindrical portion 36 in the transverse direction of the vehicle are blocked by the sidewalls.

Furthermore, as can be seen from FIG. 2, the cylindrical portion 36 is disposed at the central portion in the transverse direction of the vehicle at a lower rearward portion of the vehicle in the air conditioning case 11. There is provided an inlet opening 36a at a frontward position of the vehicle in the cylindrical portion 36 to allow the interior of the cylindrical portion 36 to communicate with the rotational working space of the rear seat air mix door 31. The inlet opening 36a has the shape of a rectangle with a longer side extending in the transverse direction of the vehicle (in the vertical direction in the page of FIG. 1), being formed across the entire width L3 (see FIG. 2) of the cylindrical portion 36 in the transverse direction of the vehicle.

The aforementioned rear seat cool air inlet 33 and the rear seat hot air inlet 34 are located at the same position as the inlet opening 36a in the transverse direction of the vehicle. Like the inlet opening 36a, the widths of both the inlets 33, 34 are the same as the width L3 of the cylindrical portion 36 in the transverse direction of the vehicle.

In the cylindrical portion 36, the rear seat face opening 37 is disposed at an upper rearward position of the vehicle. The rear seat face opening 37 has the shape of a rectangle with a longer side extending in the transverse direction of the vehicle. With a width L4 of the rear seat face opening 37 in the transverse direction of the vehicle being less than the width L3 of the cylindrical portion 36, the rear seat face opening 37 is disposed at the central portion of the cylindrical portion 36 in the transverse direction of the vehicle. As shown in FIG. 1, the rear seat face opening 37 is formed in the shape of a duct that protrudes toward the rear of the vehicle.

In the cylindrical portion 36, the rear seat foot openings 38 are provided at a lower portion on both sides in the transverse direction of the vehicle. More specifically, the rear seat foot openings 38 are formed in the shape of a duct protruding diagonally downward from the lower portion on both the right and left sides of the cylindrical portion 36.

The rear seat face opening 37 is connected with a rear seat face duct (not shown), and an extremity of the rear seat face duct is provided with a rear seat face outlet for blowing air toward the upper body of rear seat passengers. On the other hand, the rear seat foot openings 38 are connected with rear seat foot ducts (not shown), and the extremities of the rear seat foot ducts are provided with a rear seat foot outlet for blowing air toward the feet of rear seat passengers.

In a space within the cylindrical portion 36, the rear seat blow mode-changing door 39 is pivotably disposed to open or close the rear seat face opening 37 and the rear seat foot opening 38. The rear seat blow mode-changing door 39 is a butterfly door, which is formed in the shape of a Japanese character "ヘ(KU)," and is pivotable about a pivot 40. Here, the butterfly door is a plate door that pivots about the pivot 40 at the joining place of the doorplates. The doorplates 41, to be discussed later, are disposed radially from the pivot 40. In the foregoing, the doors 16, 22, 25, and 31 are all constructed to have the pivots 17, 23, 26, and 32 at one end of their doorplates, respectively, thus being a plate door of the cantilever type.

Although not illustrated in FIG. 2, the rear seat blow mode-changing door 39 is constructed such that the width of the rear seat blow mode-changing door 39 in the transverse direction of the vehicle is set to be equal to the width L3 of the cylindrical portion 36 in the transverse direction of the vehicle. This allows the rear seat blow mode-changing door 39, having the shape of a Japanese character "ヘ<(KU)," to extend through the entire inner space of the cylindrical portion 36 in the transverse direction of the vehicle.

The pivot 40 is disposed parallel to the cylindrical portion 36 inside the cylindrical portion 36, and both ends of the pivot 40 are pivotally supported at bearing holes (not shown) on both the right and left sidewalls of the cylindrical portion 36. One end of the pivot 40 protrudes out of a sidewall of the cylindrical portion 36 and is coupled via a link mechanism (not shown) to an actuator mechanism, equipped with a servo motor or the like, for switching the rear seat blow modes. The actuator mechanism pivotally actuates the rear seat blow mode-changing door 39.

Now, the rear seat blow mode-changing door 39 will be described more specifically. The pivot 40 and the doorplates 41 forming the doorplate 39 are made of resin and integrated with each other. In this arrangement, the doorplates 41 are rigid portions exhibiting a small amount of deformation against an external force. The doorplates 41 have a sealing portion 42 integrally secured to the entire outer edge portion of the doorplates 41. The sealing portion 42 is made of a resilient material such as rubber and is flexibly deformable when subject to an external force.

Furthermore, at a plurality of positions along the circumference of the cylindrical portion 36 on the inner wall surface thereof, more specifically at three positions, sealing ribs 43a, 43b, 43c are formed in the shape of a triangle in cross section to inwardly protrude. The sealing ribs 43a, 43b, 43c are formed to extend in the shape of the Japanese character "ᐱ(KO)" from the cylindrical inner wall surface of the cylindrical portion 36 to both the right and left side surfaces of the cylindrical portion 36.

Of the sealing portions 42 of the doorplates 41 of the rear seat blow mode changing door 39, the sealing portion 42 along the outer circumferential edge of the doorplates 41 (a radial extremity shown in the cross-sectional view in FIG. 1) sealingly abuts against the cylindrical inner wall portion of the sealing ribs 43a, 43b, 43c to seal between the cylindrical inner wall surface of the cylindrical portion 36 and the outer circumferential edge of the rear seat blow mode changing door 39. This seal prevents any leakage of air along the outer circumference of the door.

On the other hand, of the sealing portions 42 of the door plates 41 of the rear seat blow mode changing door 39, the sealing portion 42 (not shown), fixedly abutting against the side surfaces of the doorplates 41 in the transverse direction of the vehicle, sealingly abuts against both the right and left side portions of the sealing ribs 43a, 43b, 43c to provide sealing between both the right and left sidewalls of the cylindrical portion 36 and both the right and left side surfaces of the rear seat blow mode changing door 39, thereby preventing the leakage of air along the side portions of the door.

On the other hand, there is integrally disposed an expanded portion 44 that expands radially outward from a lower portion of the cylindrical portion 36 to a rearward portion of the vehicle. As shown in FIG. 2, the expanded portion 44 is disposed at the central portion of the cylindrical portion 36 in the transverse direction of the vehicle. The width L5 of the expanded portion 44 in the transverse direction of the vehicle is set to be smaller than the width L3 of the cylindrical portion 36 in the transverse direction of the vehicle.

The expanded portion 44 expands radially outward at a position opposite to the lower sealing portion 42 at the rotational position of the rear seat blow mode changing door 39 provided in its bi-level mode (see FIG. 1 and FIG. 3 to be discussed later). Accordingly, in the bi-level mode, this arrangement allows a gap to be defined between the sealing portion 42 along the outer circumferential edge of the rear seat blow mode changing door 39 and the inner wall of the expanded portion 44, thereby forming a bi-level mode bypass passageway 45. The arrow D indicates the airflow through the bypass passageway 45.

Now, the operation of this embodiment will be described with reference to the aforementioned arrangement. First, the front seat air conditioning function will be briefly described. The following blow modes can be set by selecting the control positions of the front seat face door 22 serving as a door means for switching the front seat blow modes, the defroster door 25, and the foot doors 28.

[Front Seat Face Mode]

The front seat face door 22 fully opens the front seat face openings 20, 21, and as well, the defroster door 25 fully opens the defroster opening 24. Additionally, the front seat foot doors 28 are actuated to overlap the right and left front seat foot openings 27, thereby fully opening the front seat foot openings 27.

Accordingly, the air blown from the blower unit (not shown) is cooled in the evaporator 12 into cool air, which is in turn blown toward the upper body of front seat passengers in the passenger compartment only from the front seat face openings 20, 21.

Suppose that the front seat air mix door 16 is actuated to the maximum cooling position 16a at which the air passageway to the heater core 13 is fully closed and the front seat cool air bypass passageway 15 is fully opened. In this case, the whole quantity of cool air having passed through the evaporator 12 can be blown, as it is, from the front seat face openings 20, 21, thereby providing maximum cooling.

Then, actuating the front seat air mix door 16 from the maximum cooling position 16a to an intermediate open position enables the airflow ratio between the cool air A1 and the hot air B1 to be adjusted depending on the opening position of the front seat air mix door 16, thereby allowing cool air adjusted to a desired temperature to be blown into the front seats in the passenger compartment.

[Front Seat Bi-Level Mode]

FIG. 1 shows a situation in which both the front and rear seats are in the bi-level mode, the defroster door 25 being actuated to allow the defroster opening 24 to be in the fully open position like in the face mode. To the contrary, the front seat face door 22 and the front seat foot doors 28 are actuated to be in an intermediate open position at which the front seat face openings 20, 21 and the front seat foot openings 27 are each in a half open position.

Accordingly, the rotational position (the degree of opening) of the front seat air mix door 16 controls the airflow ratio between the cool air A1 and the hot air B1, allowing conditioned air adjusted to a desired temperature to be blown into the front seats in the passenger compartment from both the front seat face openings 20, 21 and the front seat foot openings 27.

[Front Seat Foot Mode]

The defroster door 25 is actuated to a position at which the defroster opening 24 is slightly opened. The front seat face door 22 is actuated to allow the front seat face openings 20, 21 to be in the fully open position. To the contrary, the front seat foot doors 28 are actuated to rotate clockwise from the position shown in FIG. 1 so that the front seat foot openings 27 are in the fully open position.

Accordingly, most of the hot air, which has been temperature controlled by the airflow ratio between the cool air A1 and the hot air B1, is blown from the front seat foot openings 27 toward the feet of front seat passengers in the passenger compartment. Simultaneously, part of the hot air is blown from the defroster opening 24 toward the inner surface of the window glass of the vehicle, thereby preventing the occurrence of fogging of the window glass of the vehicle.

Suppose that the front seat air mix door 16 is actuated to the maximum heating position 16b, at which the front seat cool air bypass passageway 15 is in the fully closed position, and the air passageway to the heater core 13 is in the fully open position. In this case, the entire quantity of air blown from the blower unit passes through the evaporator 12 and is then introduced into the heater core 13 to be heated into hot air, thereby making it possible to provide the maximum heating capability.

[Defroster mode]

The defroster door 25 is actuated to allow the defroster opening 24 to be in the fully open position, while the front seat face door 22 and the front seat foot doors 28 are actuated to allow the front seat face openings 20, 21 and the front seat foot openings 27 to be in the fully closed position, respectively.

Accordingly, the air blown from the blower unit passes through the evaporator 12 and is then introduced into the heater core 13 to be heated into hot air. The resulting hot air can be blown from the defroster opening 24 toward the front window glass of the vehicle, thereby preventing the occurrence of fogging of the window glass of the vehicle. In the defroster mode, it is also possible to adjust the airflow ratio between cool air and hot air by means of the front seat air mix door 16, thereby controlling the temperature of the blown air.

If necessary, as a front seat blow mode in addition to the aforementioned modes (1) to (4), it is also possible to set a foot defroster mode in which when compared with the foot mode, the foot airflow is reduced and the defroster airflow is increased, so that the foot airflow is approximately equal to the defroster airflow.

Now, the rear seat air conditioning function will be described below for each of the blow modes shown in FIGS. 3 and 4.

[Rear Seat Face Mode]

Figure 3A:
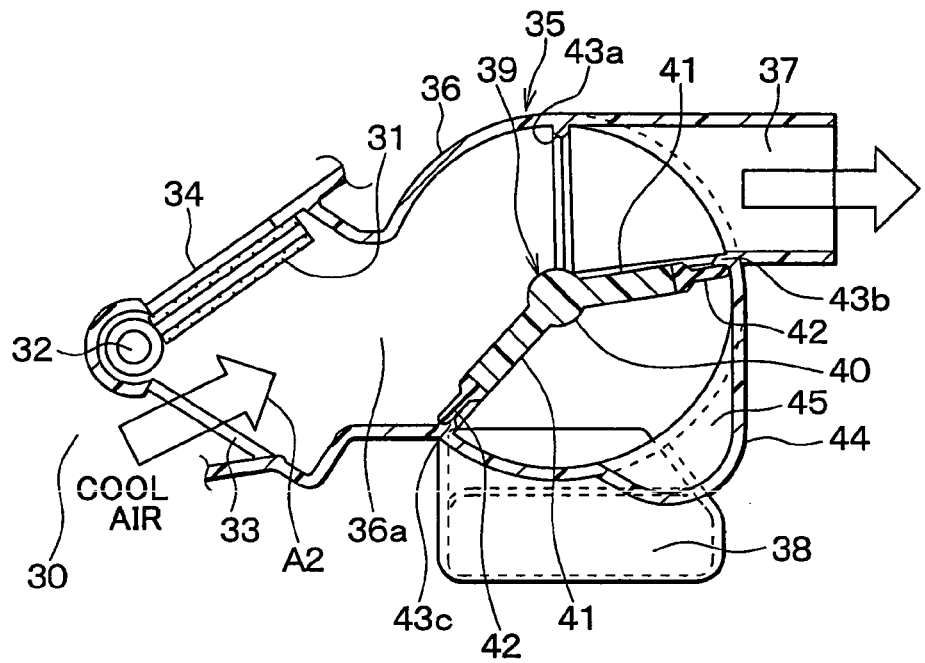
FIG. 3A is a cross-sectional view showing the main portion of the air conditioning unit in a rear seat face mode according to the first embodiment.

FIG. 3A shows the rear seat face mode in which the rear seat blow mode changing door 39 is a butterfly door formed in the shape of the Japanese character "へ(KU)" and is actuated to sealingly abut against the second and third sealing ribs 43b, 43c in the cylindrical portion 36. Here, the second sealing rib 43b is located at a lower portion of the rear seat face opening 37 in the cylindrical portion 36, while the third sealing rib 43c is located upstream of the rear seat foot openings 38 along airflow (toward the front of the vehicle) in the cylindrical portion 36. Accordingly, a lower space, of the inner space inside the cylindrical portion 36, which communicates with the rear seat foot openings 38 and the bi-level mode bypass passageway 45 inside the expanded portion 44, can be blocked against the upstream airflow portion in the cylindrical portion 36 by means of the rear seat blow mode changing door 39, which again, is formed in the shape of the Japanese character "へ(KU)."

On the other hand, the rear seat face opening 37 is in communication with the upstream airflow portion in the cylindrical portion 36 via the space above the rear seat blow mode-changing door 39 and the inlet opening 36a. Accordingly, the cool air A2 from the rear seat cool air bypass passageway 30 passes through the cool air inlet 33 and the space below the rear seat air mix door 31 and is then introduced into the upper space in the cylindrical portion 36, thereafter being directed only to the rear seat face opening 37. The cool air passes from the rear seat face opening 37 through the rear seat face duct (not shown), and is then blown toward the upper body of rear seat passengers from the rear seat face outlet that is provided on an extremity of the rear seat face duct.

In FIG. 3A, the rear seat air mix door 31 is actuated to the maximum cooling position at which the cool air inlet 33 is in the fully open position with the hot air inlet 34 being in the fully closed position, thereby allowing only the cool air A2 from the rear seat cool air bypass passageway 30 to be introduced into the rear seat face opening 37 to provide the maximum rear seat cooling capacity.

Rotating the rear seat air mix door 31 clockwise from the maximum cooling position of FIG. 3A would cause the hot air inlet 34 to open, thereby allowing part of the hot air having passed through the heater core 13 to be passed through the hot air inlet 34 and introduced into the cylindrical portion 36. This allows the cool air to be mixed with hot air, thereby making it possible to adjust the rear seat face blow temperature to a desired temperature. During a temperature control operation in which both the cool air inlet 33 and the hot air inlet 34 are opened at the same time, the inner space of the cylindrical portion 36 serves as a space for mixing cool air and hot air, i.e., a rear seat air mix portion.

[Rear Seat Foot Mode]

Figure 3B:
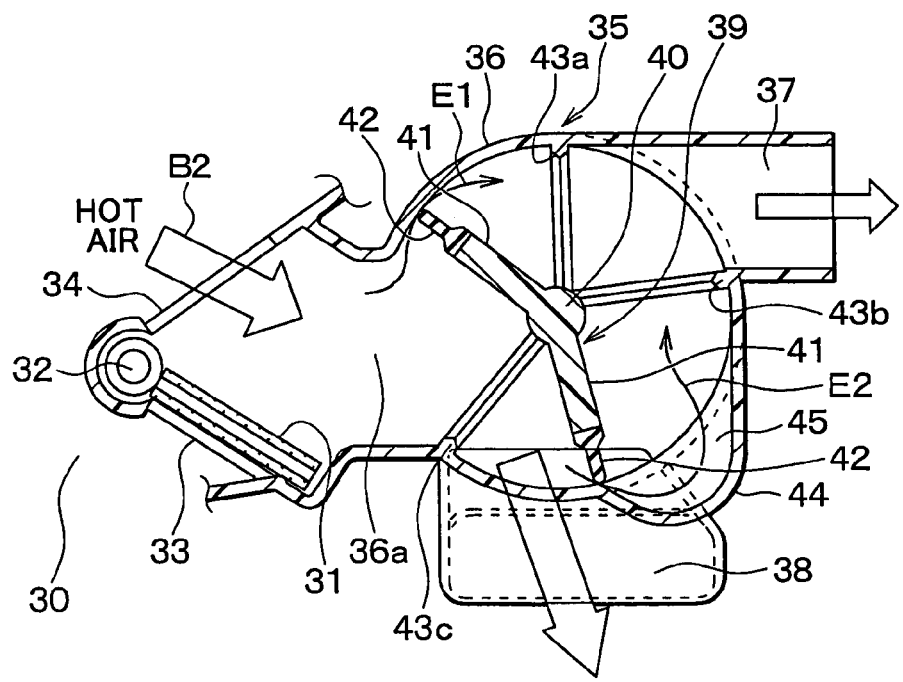
FIG. 3B is a cross-sectional view showing the main portion of the air conditioning unit in a rear seat foot mode according to the first embodiment.

FIG. 3B illustrates the rear seat foot mode in which the rear seat blow mode changing door 39, which is a butterfly door formed in the shape of a Japanese character "へ(KU)," is actuated to rotate clockwise by a predetermined angle from the position of FIG. 3A. At the actuated position of FIG. 3B, one end (the lower portion) of the rear seat blow mode changing door 39 is located upstream of the expanded portion 44 along airflow (toward the front of the vehicle) in the cylindrical portion 36. On the other hand, the other end (the upper portion) of the rear seat blow mode-changing door 39 is located at a slightly rearward portion relative to the upper end portion of the inlet opening 36a of the cylindrical portion 36.

Accordingly, the rear seat foot openings 38 communicate with the upstream airflow portion in the cylindrical portion 36 via the inlet opening 36a. This allows part of the hot air B2 having passed through the heater core 13 to flow from the hot air inlet 34 through the inlet opening 36a toward the rear seat foot openings 38. The hot air further passes through the rear seat foot ducts (not shown) and the rear seat foot outlet (not shown) to be blown toward the feet of rear seat passengers.

On the other hand, the sealing portions 42 of the rear seat blow mode changing door 39 abut against the inner wall surface of the cylindrical portion 36 without sealingly abutting against any one of the sealing ribs 43a, 43b, and 43c. In this case, the rear seat blow mode-changing door 39 is adapted to have outer dimensions so set as to define a small gap between the rear seat blow mode-changing door 39 and the inner wall surface of the cylindrical portion 36. This arrangement thus causes hot air to pass through this small gap as shown by arrows E1 and E2, allowing a very small amount of hot air to be directed toward the rear seat face opening 37.

This also makes it possible to blow a very small amount of hot air toward the upper body of rear seat passengers. Here, the amount of hot air blown toward the rear seat face side is as small as 5 to 6% of the total airflow blown toward the rear seats. This prevents the temperature of the upper body of rear seat passengers from being excessively lowered in the foot mode.

In FIG. 3B, the rear seat air mix door 31 is actuated to the maximum heating position at which the hot air inlet 34 is in the fully open position with the cool air inlet 33 being in the fully closed position. This allows only the hot air B2 from the hot air inlet 34 to be introduced into the rear seat foot openings 38 and the rear seat face opening 37 in order to provide the maximum amount of heat to the rear seat area.

Rotating the rear seat air mix door 31 counterclockwise from the maximum heating position of FIG. 3B causes the cool air inlet 33 to open, thereby allowing the cool air in the rear seat cool air bypass passageway 30 to be passed through the cool air inlet 33 and then be introduced into the cylindrical portion 36. This allows hot air to be mixed with cool air, thereby making it possible to adjust the rear seat foot blow temperature to a desired temperature.

[Rear Seat Bi-Level Mode]

Figure 4A:
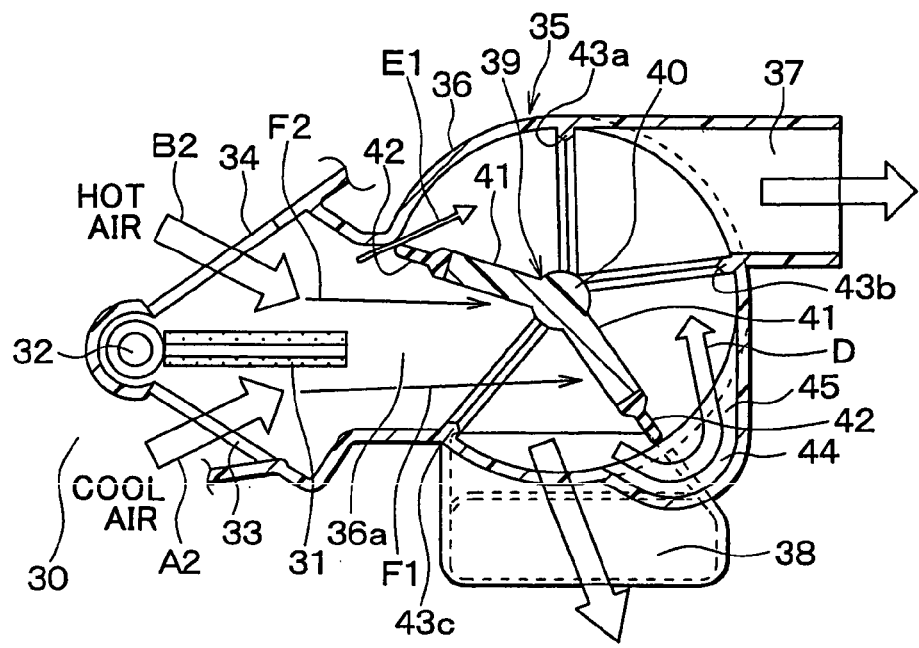
FIG. 4A is a cross-sectional view showing the main portion of the air conditioning unit in a rear seat bi-level mode according to the first embodiment.

FIG. 4A illustrates the rear seat bi-level mode in which the rear seat blow mode changing door 39, which comprises a butterfly door formed in the shape of the Japanese character "ヘ(KU)," is actuated to rotate counterclockwise by a predetermined angle from its position in FIG. 3B. At the actuated position of FIG. 4A, one end (the lower portion) of the rear seat blow mode changing door 39 is located at an intermediate portion of the expanded portion 44 in the cylindrical portion 36. This arrangement allows the rear seat face opening 37 to communicate with the upstream airflow portion in the cylindrical portion 36 via the bi-level mode bypass passageway 45 inside the expanded portion 44 and the inlet opening 36a.

Furthermore, at this time, the rear seat foot openings 38 are kept in communication with the upstream airflow portion in the cylindrical portion 36 via the inlet opening 36a. Accordingly, conditioned air can be blown toward both the upper and lower body of rear seat passengers through the rear seat face opening 37 and the rear seat foot openings 38.

According to this embodiment, even with the cool air inlet 33 being located below the hot air inlet 34, cool air can be mainly introduced to the rear seat face opening 37 located at an upper location while hot air can be mainly introduced into the rear seat foot openings 38 located at a lower location, thereby ensuring an appropriate blow temperature difference of the head-cooling foot-heating type. Now, described below is the reason why such an appropriate blow temperature difference can be ensured.

Since the bi-level mode is used mainly during intermediate seasons such as Spring and Autumn, the rear seat air mix door 31 is actuated to an intermediate opening position at which the cool air inlet 33 and the hot air inlet 34 are both opened to the same extent as shown in FIG. 4A. This causes the cool air A2 from the cool air inlet 33 and the hot air B2 from the hot air inlet 34 to advance generally in a straight line as shown by arrows F1 and F2 along the plate surfaces of the rear seat air mix door 31. The air collides against the plate surface of the rear seat blow mode changing door 39 while preventing most of the cool air A2 and the hot air B2 from mixing with each other.

At this time, the cool air A2 collides against the doorplate 41 at the lower side of the rear seat blow mode-changing door 39. However, since the doorplate 41 at the lower side is inclined in the direction of the airflow, that is, in the downstream direction of the airflow (toward the rear of a vehicle), and the extremity of the lower doorplate 41 is oriented proximate to the central portion of the expanded portion 44, the cool air A2 is smoothly introduced into the bi-level mode bypass passageway 45 inside the expanded portion 44 along the inclination of the lower door plate 41 as shown by the arrow D. The cool air is then directed toward the rear seat face opening 37 through the bi-level mode bypass passageway 45.

Here, as shown in FIG. 2, the expanded portion 44 (the bi-level mode bypass passageway 45) and the rear seat face opening 37 are located at the central portion of the cylindrical portion 36 and oriented in the transverse direction of the vehicle. Accordingly, of the cool air A2, the cool air present at the central portion in the transverse direction of the vehicle passes through the bi-level mode bypass passageway 45 and is then introduced into the rear seat face opening 37. Of the cool air A2, the cool air present on both the sides in the transverse direction of the vehicle is directed toward the rear seat foot openings 38 located at a lower portion on each side of the cylindrical portion 36 in the transverse direction of the vehicle.

This allows the main stream of the cool air to flow through the central portion of the cylindrical portion 36 in the transverse direction of the vehicle while allowing only part of the cool air at both the right and left sides to flow through both the sides of the cylindrical portion 36 in the transverse direction of the vehicle (through the portions at which the rear seat foot openings 38 are located), thereby reducing the pressure at both the right and left sides when compared with the central portion of the cylindrical portion 36. Accordingly, this causes most of the hot air B2 from the hot air inlet 34 to be pushed by the cool airflow at the central portion and thereby be introduced into the rear seat foot openings 38 at both the right and left sides.

On the other hand, part of the hot air B2 from the hot air inlet 34 passes through a very small gap defined by the extremity of the upper door plate 41 of the rear seat blow mode changing door 39 and the inner wall surface of the cylindrical portion 36 as shown by the arrow E1. This permits airflow to be introduced into the rear seat face opening 37.

Consequently, the main stream of the cool air A2 from the cool air inlet 33 at a lower location can be introduced into the rear seat face opening 37 at an upper location, while the main stream of the hot air B2 from the hot air inlet 34 at an upper location can be introduced into the rear seat foot openings 38 located at a lower location. That is, the cool air A2 and the hot air B2 can flow in a crossing manner, individually one flow at a time if desired, within and just before the cylindrical portion 36. This makes it possible to reduce, by a predetermined amount, the rear seat face blow temperature when compared with the rear seat foot blow temperature, thereby ensuring an appropriate vertical blow temperature difference and thus forming a comfortable blow temperature distribution of the head-cooling foot-heating type.

[Rear Seat Fully Closed Mode]

Figure 4B:
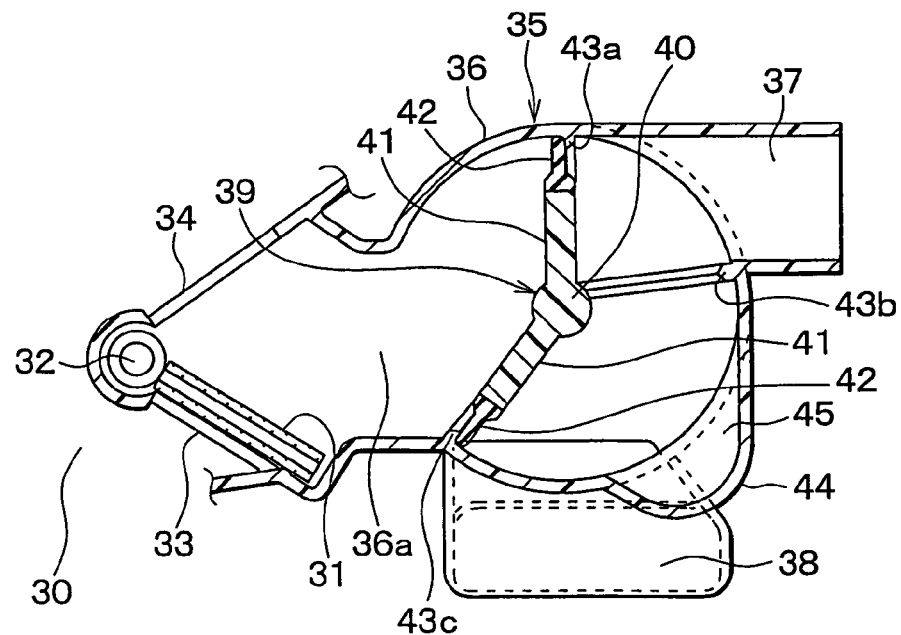
FIG. 4B is a cross-sectional view showing the main portion of the air conditioning unit in a rear seat, fully-closed mode according to the first embodiment.

FIG. 4B illustrates the rear seat fully closed mode in which the rear seat blow mode changing door 39 is actuated to rotate clockwise by a predetermined angle from the position of FIG. 4A to sealingly abut against the first and third sealing ribs 43a, 43c. In this arrangement, the first sealing rib 43a is located upstream of the rear seat face opening 37 along the airflow in the cylindrical portion 36 (frontward in the vehicle), while the third sealing rib 43c is located upstream of the rear seat foot openings 38 along the airflow in the cylindrical portion 36 (frontward in the vehicle).

Accordingly, of the space inside the cylindrical portion 36, a rearward space portion that is in communication with the rear seat face opening 37 and the rear seat foot openings 38 can be blocked against the upstream airflow portion in the cylindrical portion 36 (frontward in the vehicle) by means of the rear seat blow mode changing door 39 formed in the shape of the Japanese character "ヘ(KU)." That is, it is possible to set the rear seat fully closed state in which the rear seat face opening 37 and the rear seat foot openings 38 are simultaneously blocked, thereby eliminating blown air toward the rear seats.

This rear seat fully closed mode is set when a passenger manually selects the rear seat fully closed mode as well as when the defroster mode is selected as a front seat blow mode. When the front seat blow mode is placed into the defroster mode, the rear seat blow mode changing door 39 is actuated correspondingly automatically to the position of the rear seat fully closed mode of FIG. 4B. This allows the entire quantity of airflow from the blower unit to be blown toward the inner surface of the window glass through the defroster opening 24 with the blown air toward the rear seats being blocked to provide improved anti-fogging capability for the window glass, thus making it possible to quickly make the window glass free of fog.

[Second Embodiment]

Figure 5:
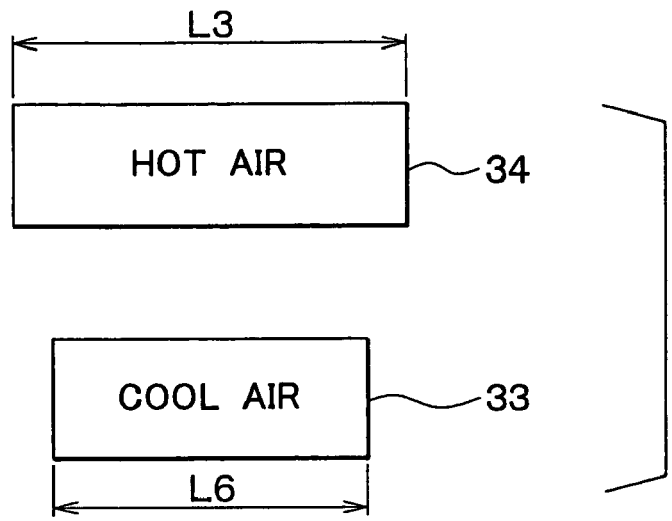
FIG. 5 is a view showing a rear seat cool air inlet and a rear seat hot air inlet according to a second embodiment.
Figure 6:
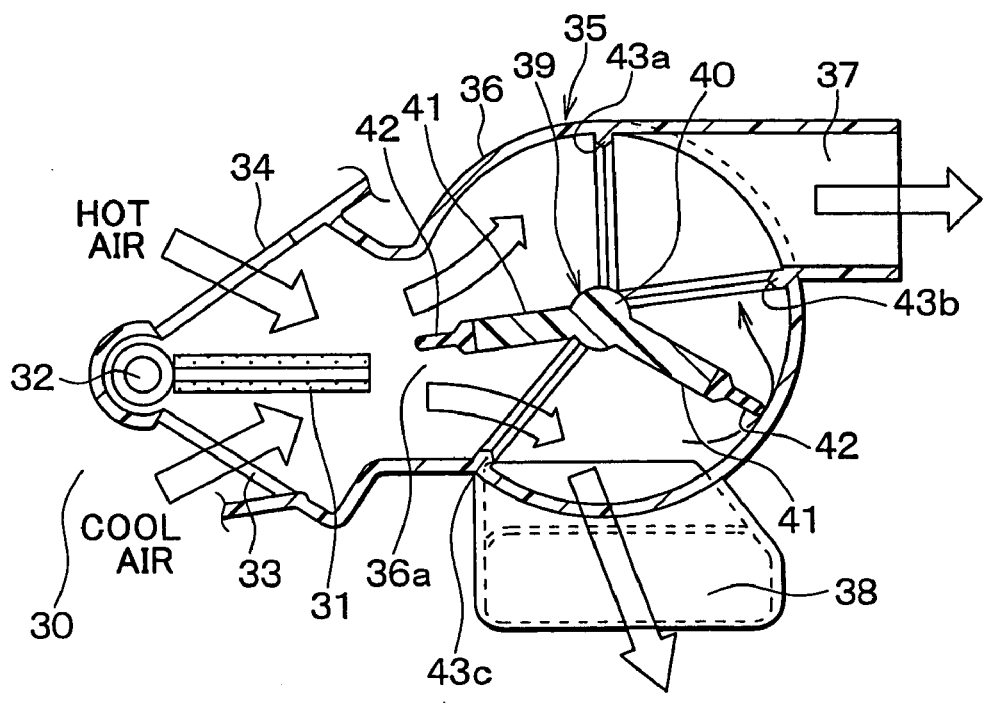
FIG. 6 is a cross-sectional view showing the main portion of a prior art air conditioning unit in a rear seat bi-level mode.

In the first embodiment, the positions of the rear seat cool air inlet 33 and the rear seat hot air inlet 34 in the transverse direction of the vehicle are set to be the same as that of the inlet opening 36a of the cylindrical portion 36. Additionally, like the inlet opening 36a, the widths of both the inlets 33, 34 are set to be the same as the width L3 of the cylindrical portion 36 in the transverse direction of the vehicle. However, in the second embodiment, as shown in FIG. 5, only the width of the rear seat hot air inlet 34 is set to be the same as the width L3 of the cylindrical portion 36 in the transverse direction of the vehicle, with a width L6 of the rear seat cool air inlet 33 being made less than the width (the width L3 of the cylindrical portion 36) of the rear seat hot air inlet 34. Here, the width L6 of the rear seat cool air inlet 33 is set to be generally the same as the width L4 of the rear seat face opening 37 shown in FIG. 2 or the width L5 of the expanded portion 44 (the bi-level mode bypass passageway 45).

According to the second embodiment, since the width L6 of the rear seat cool air inlet 33 is less than the width of the rear seat hot air inlet 34 (the width L3 of the cylindrical portion 36), cool air flows more intensively from the rear seat cool air inlet 33 through the bi-level mode bypass passageway 45 inside the expanded portion 44 in the rear seat bi-level mode. Correspondingly, hot air flows more intensively from the rear seat hot air inlet 34 into the rear seat foot openings 38 on both the right and left sides. Consequently, the second embodiment makes it possible to provide a more expanded vertical temperature difference in the rear seat bi-level mode than the first embodiment, thereby providing improved feeling effects with respect to head-cooling foot-heating.

Other Embodiments

In the first embodiment, the width L4 of the rear seat face opening 37 and the width L5 of the expanded portion 44 (the bi-level mode bypass passageway 45) are less than the width L3 of the cylindrical portion 36 in the transverse direction of the vehicle. Additionally, the rear seat face opening 37 and the expanded portion 44 (the bi-level mode bypass passageway 45) are disposed at the central portion of the cylindrical portion 36 in the transverse direction of the vehicle. However, the width L4 of the rear seat face opening 37 and the width L5 of the expanded portion 44 (the bi-level mode bypass passageway 45) can also be set to be the same as the width L3 of the cylindrical portion 36 in the transverse direction of the vehicle.

This arrangement increases the passageway areas of the bi-level mode bypass passageway 45 and the rear seat face opening 37, thereby making it possible to reduce the pressure loss in the rear seat face passageway and increase the blown-airflow of the rear seat face side.

However, when set as described above such that L4 and L5 =L3, cool air more likely flows from the rear seat cool air inlet 33 into the rear seat foot openings 38 at both the right and left sides than in the first embodiment, while hot air more likely flows from the rear seat hot air inlet 34 into the rear seat face opening 37 than in the first embodiment. This causes the vertical temperature difference of the head-cooling foot-heating type to tend to be reduced.

On the other hand, as described above, setting the width L5 of the expanded portion 44 to be the same as the width L3 of the cylindrical portion 36 in the transverse direction of the vehicle would cause the expanded portion 44 to interfere with the duct-shaped portion of the rear seat face opening 37 shown in FIGS. 1 and 2, thus making it necessary to dispose the duct-shaped portion of the rear seat face opening 37 further outwardly in the transverse direction from both the right and left side surfaces of the cylindrical portion 36.

In the first embodiment, such a case has been described in which the front seat and rear seat air mix doors 16, 31 and the front seat and rear seat blow mode changing doors 22, 25, 28, 39 are all actuated by means of an actuator mechanism (an electric drive mechanism) equipped with a servo motor. However, all the air mix doors 16, 31 and the blow mode changing doors 22, 25, 28, 39 may also be designed to be actuated by means of a manually operated mechanism that is activated manually by a passenger.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air-conditioning system for a vehicle comprising:
an air conditioning case defining a first housing portion and a second housing portion, said second housing portion being disposed at a location downstream of said first housing portion in an air flow direction;
a heating heat exchanger disposed in said first housing portion for heating air; and
a blow-mode changing door pivotably housed in a door-housing portion defined by said second housing portion, wherein
said second housing portion defines a first air inlet and a second air inlet which communicate with said first housing portion, said second air inlet is disposed higher than said first air inlet,
said first air inlet permits cool air to enter said second housing portion from said first housing portion, and said second air inlet permits hot air having passed through said heating heat exchanger to enter said second housing portion from said first housing portion,
said second housing portion further defines a foot opening and a face opening disposed downstream of said first air inlet and said second air inlet, said face opening is disposed higher than said foot opening,
said blow-mode changing door is a butterfly door movable to a first position where said foot opening is fully closed and said face opening is open, a second position where said foot opening is open and said face opening is closed, and a third position where said foot opening and said face opening are open, wherein
in a bi-level mode in which said blow mode changing door is at said third position, a bi-level mode bypass passageway for introducing cool air from said first air inlet into said face opening is defined between an extremity of said blow mode-changing door and an inner wall surface of said door-housing portion.

2. The vehicle air conditioning system according to claim 1, further comprising:
a sealing rib provided on the inner wall surface of said door-housing portion, wherein
said blow mode-changing door sealingly abuts against said sealing rib, thereby simultaneously blocking both said foot opening and said face opening.

3. The vehicle air conditioning system according to claim 2, wherein
said door-housing portion is formed of a cylindrical portion parallel to an axial direction of said blow mode-changing door,
an expanded portion expanded radially outward is formed on part of a circumferential surface of said cylindrical portion, and
said bi-level mode bypass passageway is formed inside said expanded portion.

4. The vehicle air conditioning system according to claim 2, wherein
said door-housing portion is disposed so as to extend in a transverse direction of the vehicle,
said foot opening is disposed at either side of said cylindrical portion in the transverse direction of the vehicle,
a width of said cool air inlet in the transverse direction of the vehicle is less than a width of said hot air inlet in the transverse direction of the vehicle, and
said bi-level mode bypass passageway is located at a position corresponding to said cool air inlet in said door-housing portion in the transverse direction of the vehicle.

5. The vehicle air conditioning system according to claim 4:
wherein said first housing portion defines an air passage through which air to be blown toward front seats in a passenger compartment flows and a rear seat cool air bypass passageway below said heating heat exchanger,
said first air inlet is a rear seat cool air inlet through which cool air is introduced from said bypass passageway to said second housing portion,
said second air inlet is a rear seat hot air inlet through which the hot air having passed through said heating heat exchanger is introduced into the second housing portion,
said foot opening is a rear seat foot opening for blowing air toward a foot of a rear seat passenger, and
said face opening is a rear seat face opening for blowing air toward an upper body of a rear seat passenger.

6. The vehicle air conditioning system according to claim 1, wherein
said door-housing portion is formed of a cylindrical portion parallel to an axial direction of said blow mode-changing door,
an expanded portion expanded radially outward is formed on part of a circumferential surface of said cylindrical portion, and
said bi-level mode bypass passageway is formed inside said expanded portion.

7. The vehicle air conditioning system according to claim 6, wherein
said cylindrical portion is disposed so as to extend in a transverse direction of the vehicle, with said expanded portion and said face opening being disposed at a central portion of the cylindrical portion in the transverse direction of the vehicle, and
said foot opening is disposed at either side of said cylindrical portion in the transverse direction of the vehicle.

8. The vehicle air conditioning system according to claim 1, wherein
said door-housing portion is disposed so as to extend in a transverse direction of the vehicle,
said foot opening is disposed at either side of said cylindrical portion in the transverse direction of the vehicle,
a width of said cool air inlet in the transverse direction of the vehicle is less than a width of said hot air inlet in the transverse direction of the vehicle, and
said bi-level mode bypass passageway is located at a position corresponding to said cool air inlet in said door-housing portion in the transverse direction of the vehicle.

9. The vehicle air conditioning system according to claim 8:
wherein said first housing portion defines an air passage through which air to be blown toward front seats in a passenger compartment flows and a rear seat cool air bypass passageway below said heating heat exchanger,
said first air inlet is a rear seat cool air inlet through which cool air is introduced from said bypass passageway to said second housing portion,
said second air inlet is a rear seat hot air inlet through which the hot air having passed through said heating heat exchanger is introduced into the second housing portion,
said foot opening is a rear seat foot opening for blowing air toward a foot of a rear seat passenger, and
said face opening is a rear seat face opening for blowing air toward an upper body of a rear seat passenger.

10. The vehicle air conditioning system according to claim 1:
wherein said first housing portion defines an air passage through which air to be blown toward front seats in a passenger compartment flows and a rear seat cool air bypass passageway below said heating heat exchanger,
said first air inlet is a rear seat cool air inlet through which cool air is introduced from said bypass passageway to said second housing portion,
said second air inlet is a rear seat hot air inlet through which the hot air having passed through said heating heat exchanger is introduced into the second housing portion,
said foot opening is a rear seat foot opening for blowing air toward a foot of a rear seat passenger, and
said face opening is a rear seat face opening for blowing air toward an upper body of a rear seat passenger.

11. An apparatus comprising:
a case defining a first air inlet and a second air inlet, wherein said second air inlet is disposed higher than said first air inlet, said first air inlet permits cool air to enter said case and said second air inlet permits hot air to enter said case;
a foot opening defined by said case and disposed lower than said first air inlet and said second air inlet;
a face opening defined by said case and disposed higher than said first air inlet and said second air inlet;
a blow mode-changing door, wherein said door is a butterfly door movable to a first position where said foot opening is fully closed and said face opening is open, a second position where said foot opening is open and said face opening is closed, and a third position where said foot opening and said face opening are open;
a door housing portion defined by the case for pivotally housing said blow mode changing door, wherein
the door housing portion is formed of a cylindrical portion parallel to an axial direction of said blow mode-changing door,
an expanded portion expanded radially outward is formed on a part of a circumferential surface of said door housing portion,
a bi-level mode bypass passageway is formed inside said expanded portion, and said bi-level mode passageway permits cool air flow from said first air inlet into said face opening.

* * * * *